(12) United States Patent
Ellison

(10) Patent No.: US 11,774,466 B2
(45) Date of Patent: Oct. 3, 2023

(54) AIRCRAFT WITH SKIN LAYER AIR DATA SENSOR

(71) Applicant: BAE Systems plc, London (GB)

(72) Inventor: William Frank Ellison, Preston (GB)

(73) Assignee: BAE Systems plc, London (GB)

(*) Notice: Subject to any disclaimer, the term of this patent is extended or adjusted under 35 U.S.C. 154(b) by 113 days.

(21) Appl. No.: 17/615,135

(22) PCT Filed: Jun. 4, 2020

(86) PCT No.: PCT/GB2020/051349
§ 371 (c)(1),
(2) Date: Nov. 30, 2021

(87) PCT Pub. No.: WO2020/245588
PCT Pub. Date: Dec. 10, 2020

(65) Prior Publication Data
US 2022/0244286 A1    Aug. 4, 2022

(30) Foreign Application Priority Data

Jun. 5, 2019 (EP) .................................... 19275074
Jun. 5, 2019 (GB) .................................... 1907984

(51) Int. Cl.
*G01P 5/16* (2006.01)
*B64D 43/02* (2006.01)

(52) U.S. Cl.
CPC ............... *G01P 5/16* (2013.01); *B64D 43/02* (2013.01)

(58) Field of Classification Search
CPC ........ G01P 13/025; G01P 5/165; G01P 13/02; G01P 5/14; G01P 5/16; G01P 5/00; G01P 5/02; G01P 5/12; G01P 5/245; G01P 21/025; G01P 5/07; G01P 5/04; G01P 1/02; G01P 1/08; G01P 5/10; G01P 5/06;
(Continued)

(56) References Cited

U.S. PATENT DOCUMENTS 3,262,316 A   7/1966 Hansen et al.
5,433,635 A   7/1995 Kobyashi
(Continued)

FOREIGN PATENT DOCUMENTS

EP   2866035 A1 *  4/2015 ............. B64D 43/02
EP   2453245 A1    5/2015
(Continued)

OTHER PUBLICATIONS

Extended European Search Report for EP Appl. No. 19275074.3-1010 dated Dec. 6, 2019, 8 Pages.
(Continued)

*Primary Examiner* — Andre J Allen
(74) *Attorney, Agent, or Firm* — Maine Cernota & Rardin

(57) ABSTRACT

There is disclosed an aircraft configured to collect air data, the aircraft comprising: a wing structure; a forebody, forward of the wing structure; an afterbody, backward of the forebody; a skin covering the wing, the forebody and the afterbody; at least one recess formed at the skin, the recess being configured to affect the pressure of air flowing at the recess; at least one ambient sensor port for measuring ambient air pressure at the skin; and at least one recess sensor port for measuring the air pressure at the recess.

15 Claims, 6 Drawing Sheets

(58) Field of Classification Search
CPC .. G01P 5/18; G01P 5/26; G01P 13/045; G01P 5/005; G01P 5/08; G01P 21/00; G01P 3/62; G01P 5/175; G01P 5/24; G01P 15/00; G01P 15/036; G01P 5/006; G01P 5/083; G01P 5/086; G01P 5/241; G01P 7/00; G01P 5/001; B64D 43/02; B64D 15/20; B64D 43/00; B64D 15/12; B64D 1/18; B64D 1/20; B64D 15/16; B64D 15/22; B64D 2033/0286; B64D 33/02; B64D 45/00; B64D 33/08
USPC ...................................................... 73/170.02
See application file for complete search history.

(56) References Cited

U.S. PATENT DOCUMENTS

| | | | |
|---|---|---|---|
| 6,134,485 A | 10/2000 | Tanielian | |
| 6,253,166 B1 | 6/2001 | Whitmore | |
| 2003/0115948 A1* | 6/2003 | Rouse | G01P 5/14 |
| | | | 73/170.02 |
| 2005/0131591 A1* | 6/2005 | Drutowski | G01P 13/025 |
| | | | 701/5 |
| 2009/0000386 A1 | 1/2009 | Paradis | |
| 2016/0266164 A1 | 9/2016 | Ellison | |

FOREIGN PATENT DOCUMENTS

| | | | | |
|---|---|---|---|---|
| EP | 3770609 B1 * | 5/2023 | ............ | G01C 23/00 |
| ER | 2826632 A1 | 1/2003 | | |
| FR | 2912214 A1 | 8/2008 | | |
| GB | 2173861 A | 10/1986 | | |
| GB | 2424285 A | 9/2006 | | |
| GB | 2424957 A | 4/2009 | | |
| GB | 2519668 A * | 4/2015 | ............ | B64D 43/02 |
| WO | 03058257 A1 | 7/2003 | | |
| WO | 2015059085 A1 | 4/2015 | | |

OTHER PUBLICATIONS

GB Search Report for GB appl. No. 1907984.7, dated Nov. 14, 2019, 4 Pages.

International Search Report & Written Opinion for PCT/GB2020/051349 dated Aug. 5, 2020, 13 Pages.

GB Search Report for GB appl. No. 1907984.7 dated Sep. 1, 2022, 4 pages.

* cited by examiner

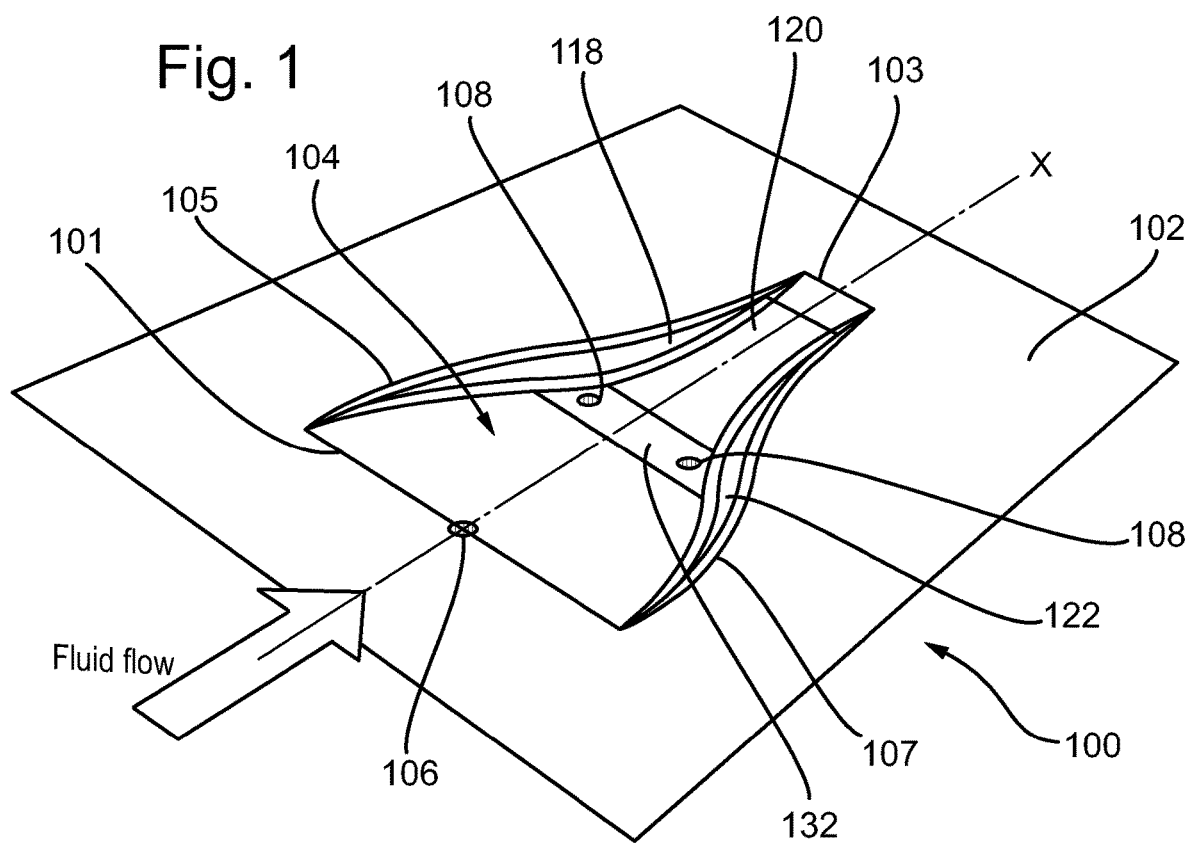
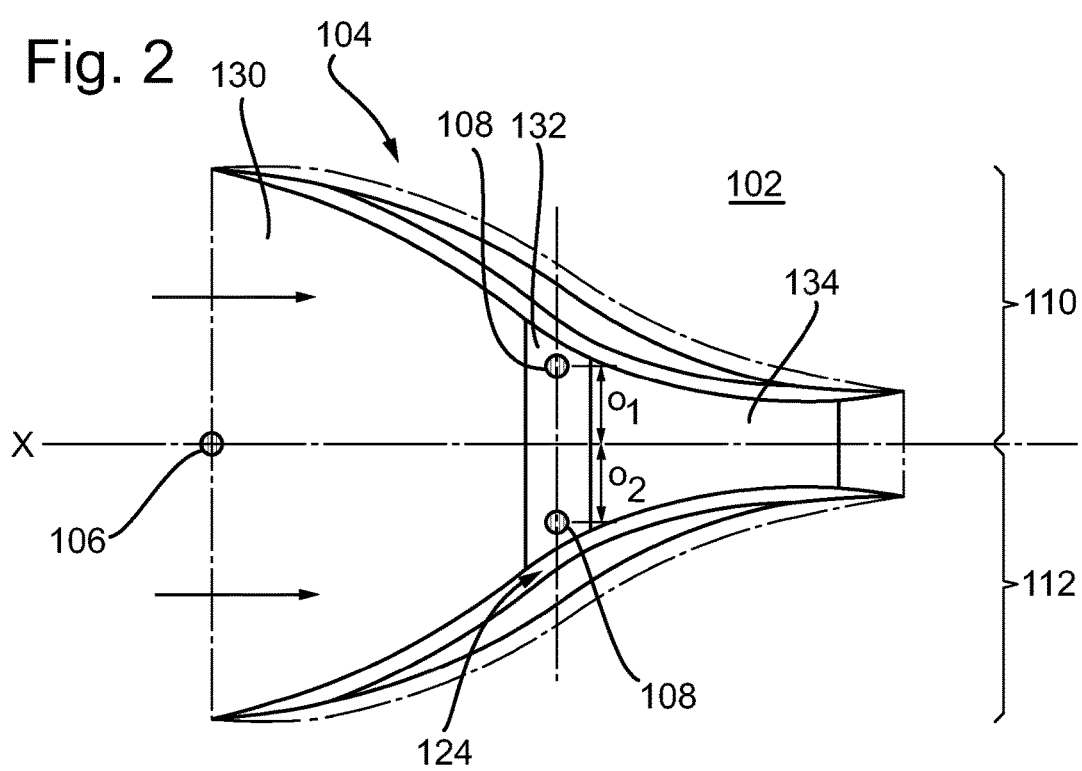

AIRCRAFT WITH SKIN LAYER AIR DATA SENSOR

RELATED APPLICATIONS

This application is a national phase application filed under 35 USC § 371 of PCT Application No. PCT/GB2020/051349 with an International filing date of Jun. 4, 2020, which claims priority of GB Patent Application 1907984.7 filed Jun. 5, 2019 and EP Patent Application 19275074.3 filed Jun. 5, 2019. Each of these applications is herein incorporated by reference in its entirety for all purposes.

FIELD OF THE INVENTION

The present invention relates to an aircraft configured to collect air data and a method of determining air flow at an aircraft.

BACKGROUND OF THE INVENTION

It is known from the applicant's earlier application WO 2015/059085 to provide at an aircraft an air flow sensor comprising a blister, projecting from a surface into local air flow, and which is provided with air pressure ports adjacent to the blister. The blister modifies local fluid dynamics, and characteristics of the air flow at the aircraft can be determined from the air pressure data obtained at the pressure ports.

SUMMARY OF THE INVENTION

According to a first aspect of the invention there is provided an aircraft configured to collect air data, the aircraft comprising: a wing structure; a forebody, forward of the wing structure; an afterbody, backward of the forebody; a skin covering the wing, the forebody and the afterbody; at least one recess formed at the skin, the recess being configured to affect the pressure of air flowing at the recess; at least one ambient sensor port for measuring ambient air pressure at the skin; and at least one recess sensor port for measuring the air pressure at the recess.

The at least one recess may be formed at the forebody of the aircraft.

The at least one recess may be formed on a substantially lateral part of the forebody, or a substantially lower part of the forebody.

The aircraft may comprise at least a first and a second recess, and further may comprise: at each recess, a transducer at each of the respective sensor ports for converting the detected air pressure into an air pressure signal, a processor operably connected to each of the transducers at each of the recesses and configured to: receive the air pressure signal from each transducer; generate from the air pressure signals an air pressure profile; and determine, using the air pressure profile, at least one characteristic of the air.

By considering air data from more than one distinct air sensor, a more detailed understanding of the air flow at the aircraft can be developed. Further, comparisons may be drawn between each air sensor reading that allow further inferences to be made. Such further inferences could include flight characteristics such as pressure altitude, angle of attack and sideslip.

The first recess may be provided at a port-side lateral part of the forebody. The second recess may be provided at a starboard-side lateral part of the forebody.

The provision of sensor recesses in such areas can reduce the likelihood of aerodynamic disturbances from other parts of the aircraft. For example positioning a sensor aft of the wing may lead to only turbulent air flowing over the sensor.

Further, by avoiding the uppermost surfaces of the fuselage, the risk of water occupying the fluid port is mitigated.

The aircraft may comprise a third recess.

The provision of three or more recesses allows averaging schemes or majority voting schemes to be put into place to for example eliminate or mitigate the readings from a malfunctioning sensor.

Each of the at least one recesses comprises a first recess sensor port and a second recess sensor port.

The provision of more than one recess sensor port can allow inferences to be made about the direction of air flow local to the respective sensor.

Each of the at least one recesses may be configured for channeling air along a particular course axis, and that course axis is aligned with the aircraft longitudinal axis.

As such the drag of the recessed air sensor may tend to be reduced. As such beneficial flow properties of the ambient air may be preserved.

According to a second aspect of the invention, there is provided a method of determining air flow at an aircraft, the aircraft comprising: a wing structure; a forebody, forward of the wing structure; an afterbody, backward of the forebody; a skin covering the wing, the forebody and the afterbody; at least one recess formed at the skin, the recess being configured to affect the pressure of air flowing at the recess; at least one ambient sensor port for measuring ambient air pressure at the skin; and at least one recess sensor port for measuring the air pressure at the recess, the method comprising: exposing the aircraft to air flow; detecting the air pressure at each of the ambient sensor port and the recess sensor port, to determine an air pressure profile; acquiring a relationship between the air pressure profile and a predetermined air characteristic; and applying the relationship to the air pressure profile to determine a value for the predetermined air characteristic.

Exposing the air sensor to air flow may comprise flying the aircraft.

The aircraft may further comprise at least one further recess formed at the skin, the method further comprising: detecting the air pressure at each of the ambient sensor and the recess sensor port of the further recess to determine an air pressure profile for the at least one further recess; acquiring a relationship between the air pressure profile for the at least one further recess and the predetermined air characteristic; and applying the relationship to the air pressure profile for the further recess to determine at least one further value for the predetermined air characteristic.

The method may further comprise: comparing the value for the predetermined air characteristic to the at least one further value of the predetermined characteristic.

At least two further recesses may be provided and comparing the value of the predetermined characteristic to the at least two further values of the predetermined characteristic comprises determining an average value.

BRIEF DESCRIPTION OF THE DRAWINGS

So that the invention may be well understood at least one embodiment thereof will be described below, with reference to the following figures of which:

FIG. 1 shows a three-dimensional representation of a fluid sensor;

FIG. 2 shows an elevation representation of the fluid sensor of FIG. 1;

DETAILED DESCRIPTION

Figure 3A:
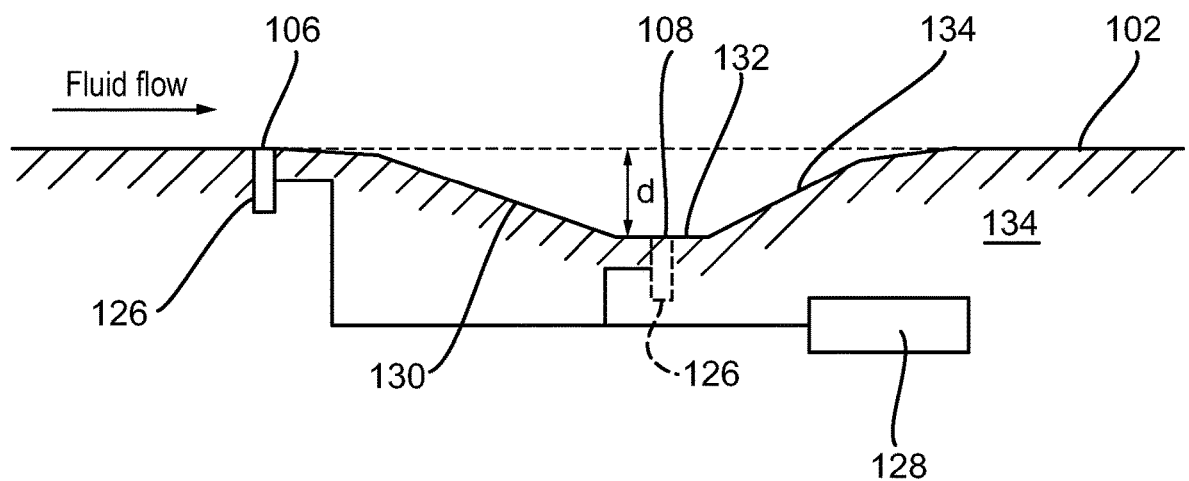
FIG. 3a shows a cross sectional view of the fluid sensor of FIG. 1, along a longitudinal axis.
Figure 3B:
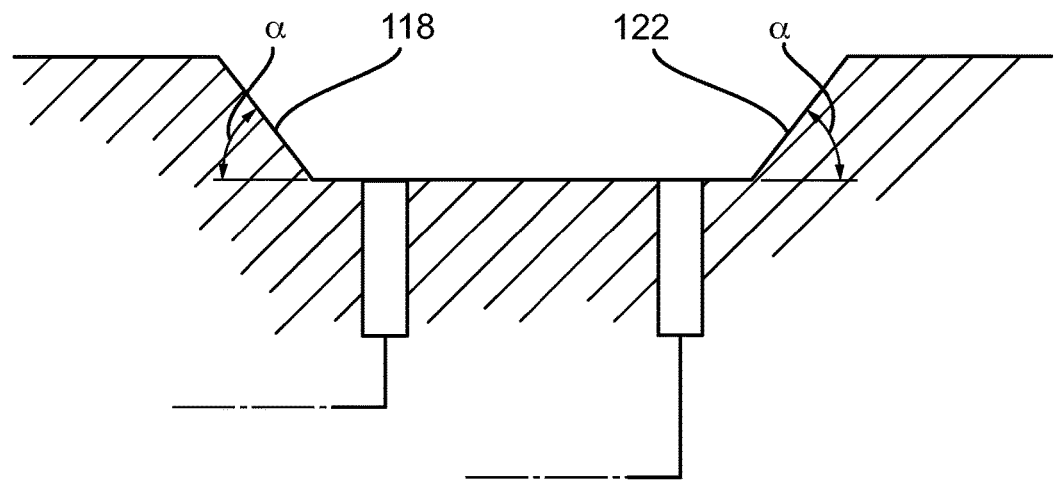
FIG. 3b shows a cross sectional view of the fluid sensor of FIG. 1, along a lateral axis.

Referring to FIGS. 1, 2, 3a and 3b there is shown a first fluid sensor 100 comprising a surface 102, a recess 104, an ambient sensor port 106 and recess sensor ports 108.

The surface 102 may be part of the outer skin of a body, vehicle or platform. The surface 102 is a planar surface; however variant surfaces are contemplated that need not be planar.

The fluid sensor 100 is substantially symmetrical, having a similar first 110 and second 120 side, and thereby defines a longitudinal axis X about which it is symmetrical. (Alternative embodiments are envisaged which would not need to be symmetrical).

The rim of the recess 104 comprises a leading edge 101, a trailing edge 103 and two side edges 105, 107. These edges together generally define a funnel shape.

The recess 104 is defined by a first side wall 118, a floor 120 and a second side wall 122.

The floor 120 extends from both the leading edge 101 and the trailing edge 103 to a maximum depth section 132. Further, the floor 120 extends to the base of each of the first and second side walls 118, 122.

The floor comprises a down-ramp section 130 interconnecting the leading edge 101 with the maximum depth section 132. The floor 120 comprises an up-ramp section 134 interconnecting the maximum depth section 132 with the trailing edge 103. The longitudinal aspect of the down-ramp section 130 is approximately equal to the longitudinal aspect of the up-ramp section 134, thereby locating the maximum depth section 132 at the longitudinal centre of the sensor. (As shown, the maximum depth section 132 is approximately a quarter the length of the down-ramp or up-ramp section, longitudinally. Thus it occupies a central 'ninth' (approximately 10%) of the longitudinal aspect of the sensor. However, in other embodiments the maximum depth section may be wider, occupying a central 10-30%).

The leading edge 101 is wider than the trailing edge 103. In the present sensor, the leading edge 101 is approximately four times wider than the trailing edge 103.

The side walls 118 and 122 extend from the surface 102 at the side edges 105 and 107 respectively at an angle α configured to balance sensing performance (in particular to maximise the pressure effect) and minimisation of flow separation (in particular the avoidance of flow separation altogether). Accordingly the angle may be approximately 45 degrees. (In variants on this embodiment, the angle may be any angle between 30 and 60 degrees). Each of the side walls 118 and 122 abut the floor 120 at their respective bases.

Each side edge 105, 107 is curved with a single point of inflection 124 approximately at its midpoint. Accordingly each side edge defines an S-curve. The curvature is such that the offset between the wall and the axis reduces increasingly going from the leading edge 101 to the point of inflection 124 but reduces decreasingly going from the point of inflection 124 to the trailing edge 103.

Thus the recess provides a smoothly tapered channel through which fluid can flow with reduced chance of boundary layer separation occurring, whilst tending to provide certain areas within the recess where fluid pressure will be higher compared to the surface.

To measure the ambient pressure, the ambient sensor port 106 is positioned at the leading edge 101 and on the longitudinal axis.

To measure the higher pressure in the recess 104, the recess sensor ports 108 are provided at the maximum depth section 132 of the floor 120. In the present sensor, two recess ports are provided and these are offset laterally in opposite directions from the longitudinal axis by a distance $o_1$ and $o_2$. Here $o_1$ and $o_2$ are substantially equal.

Referring particularly to FIG. 3a, for each sensor port 106, 108 there is further provided a transducer 126. The transducers 126 are operably connected to a processor 128.

Each transducer 126 is arranged at its respective sensor port such that it may detect the fluid pressure at the port and convert that into a fluid pressure signal for passing to the processor 128.

As shown in FIG. 3a, the transducers 126 are located at the mouth of the ports 108; however, in alternative embodiments, the transducers 126 may be remote from the mouth of the ports 108 and in communication therewith by way of an interconnecting channel.

Figure 4:
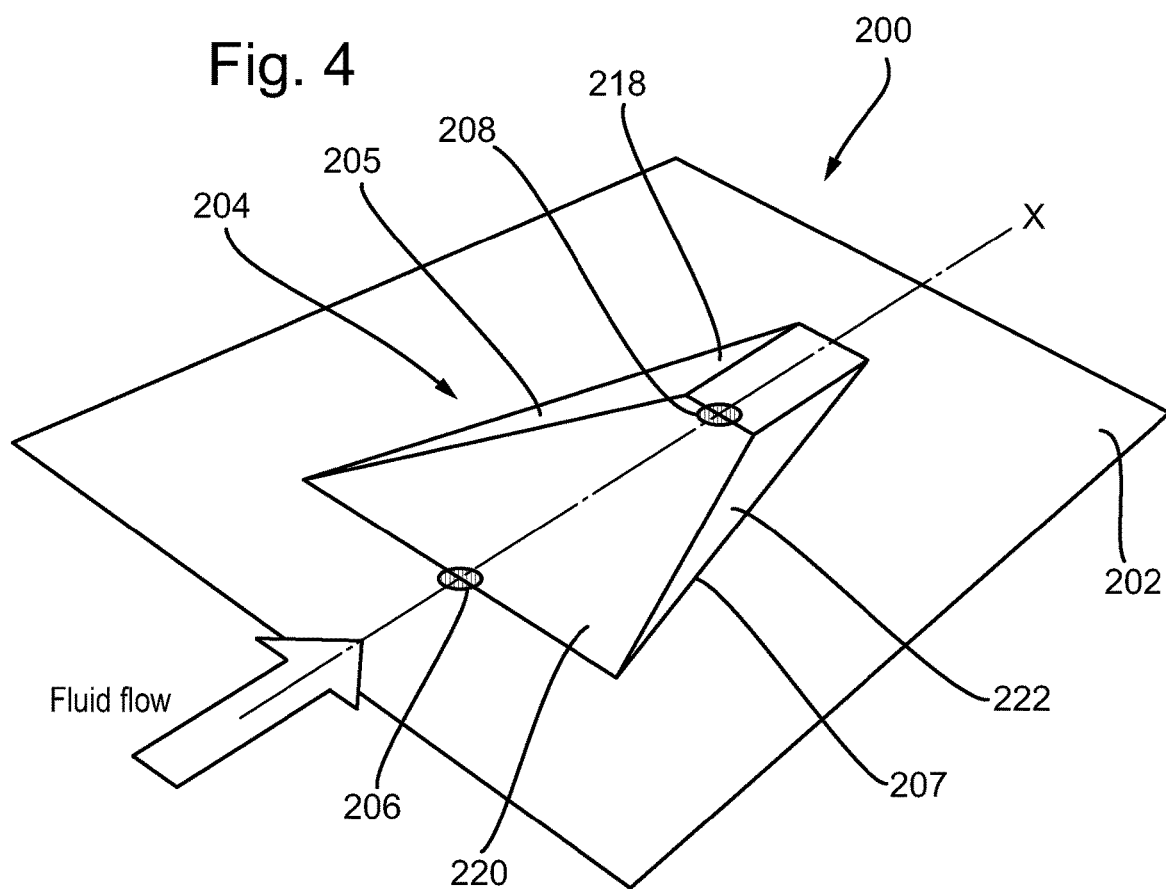
FIG. 4 shows a three-dimensional representation of a further fluid sensor.
Figure 5:
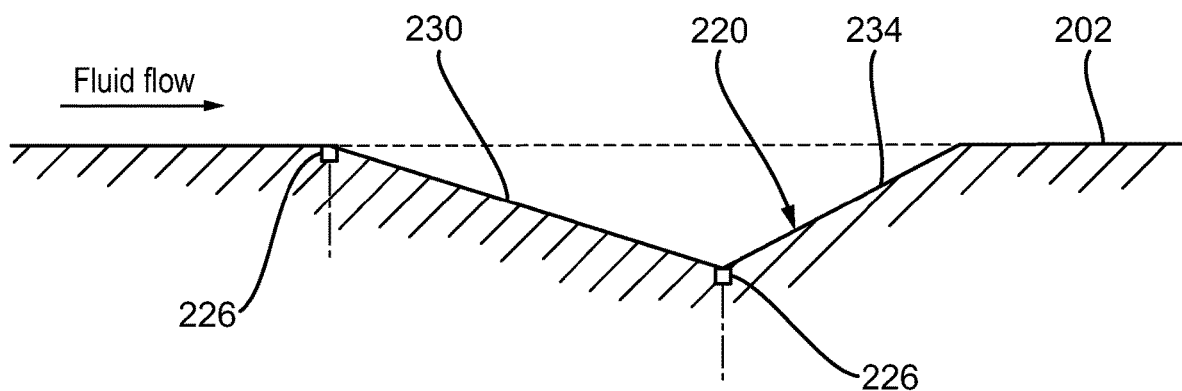
FIG. 5 shows a cross sectional view of the fluid sensor of FIG. 4 along a longitudinal axis.

Referring to FIGS. 4 and 5, a second fluid sensor 200 is shown. This fluid sensor is broadly similar to the first fluid sensor 100 and so for clarity not all components are discussed or provided with a reference numeral. Where reference numerals are provided in respect of a component which is comparable to one in the first fluid sensor 100, the reference numeral may be incremented by 100.

The second fluid sensor 200 comprises a recess 204 which is defined by a floor 220 and a pair of side walls 218 and 222.

The floor comprises a down-ramp 230 and an up-ramp 234 section where the down-ramp 230 has a greater longitudinal aspect than the up-ramp 234 section.

Each side wall extends from a respective side edge 205 or 207. The side edges are substantially straight lines and as such, the side walls taper gradually but are not curved.

As such the rim of the recess 204 generally defines a trapezoidal shape.

A single ambient port 206 is provided at the leading edge and on the longitudinal axis X.

A single recess port 208 is provided at the maximum depth section of recess 204 and the longitudinal axis X.

Figure 6:
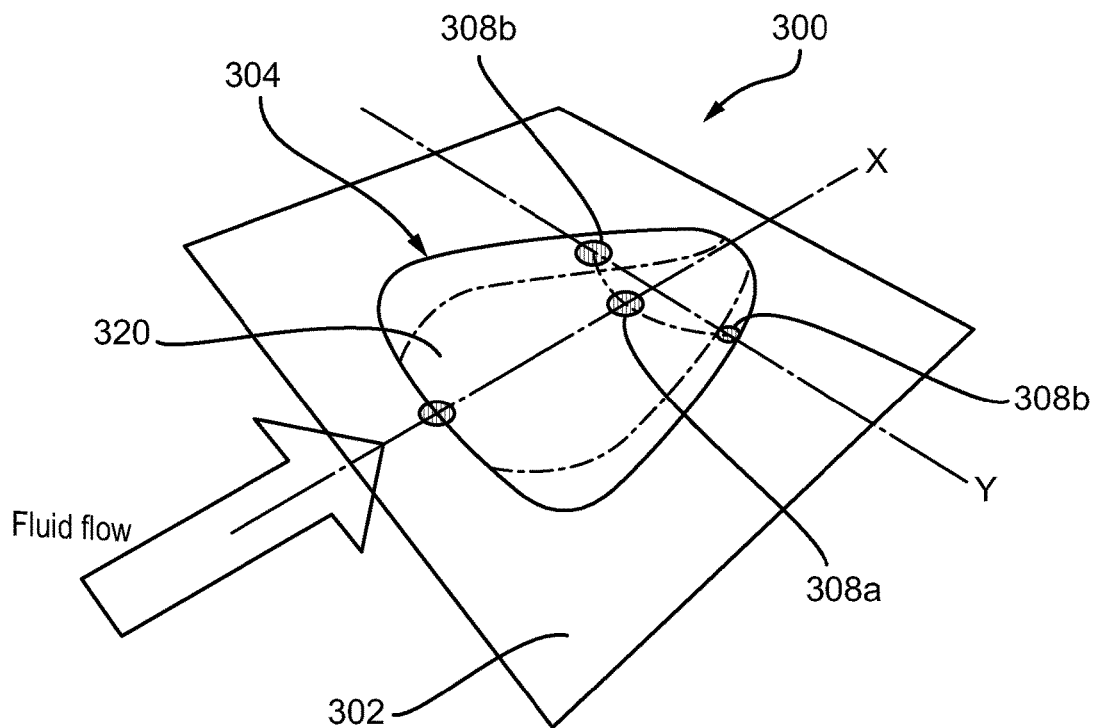
FIG. 6 shows three-dimensional representation of a still further fluid sensor.
Figure 7:
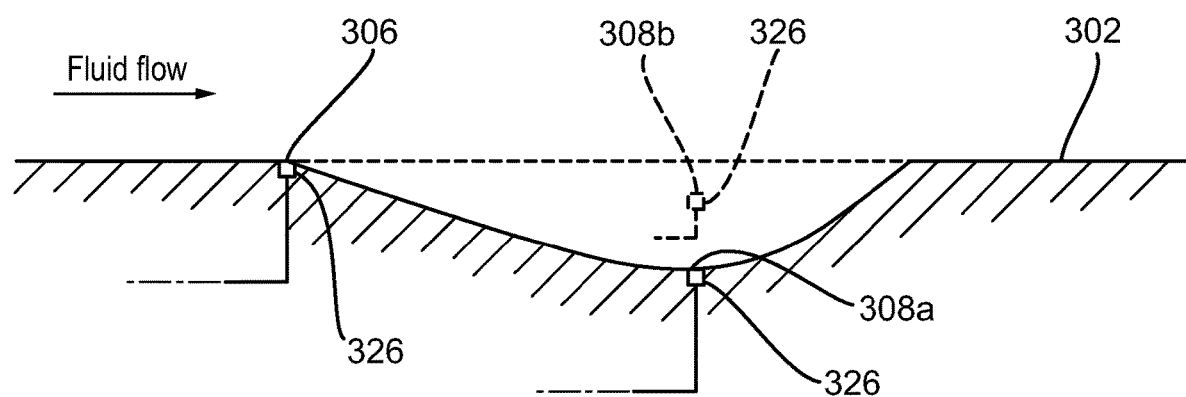
FIG. 7 shows a cross sectional view of the fluid sensor of FIG. 6 along a longitudinal axis.

Referring to FIGS. 6 and 7, a third fluid sensor 300 is shown. This fluid sensor is broadly similar to the first and second fluid sensors 100, 200 and so for clarity not all components are discussed or provided with a reference numeral. Where reference numerals are provided in respect of a component which is comparable to one in the first fluid sensor 100, the reference numeral may be incremented by 200.

The third fluid sensor 300 defines a recess 304 which has a rim in the general shape of a filleted equilateral triangle.

The recess 304 is defined by a single curved floor surface 320 which extends down from the rim at surface 302 to a maximum depth. To aid with understanding of this surface, dashed lines are provided in FIG. 6.

The fluid sensor 300 comprises an ambient port 306 (at a leading edge of the rim) and three recess ports 308a, 308b. The central sensor port 308a is positioned at a region of maximum depth and on the longitudinal axis X. The lateral sensor ports 308b are positioned at an intermediate depth and are offset from the longitudinal axis X by an equal and opposite amount along the lateral axis Y passing through the sensor port 308a.

Figure 8:
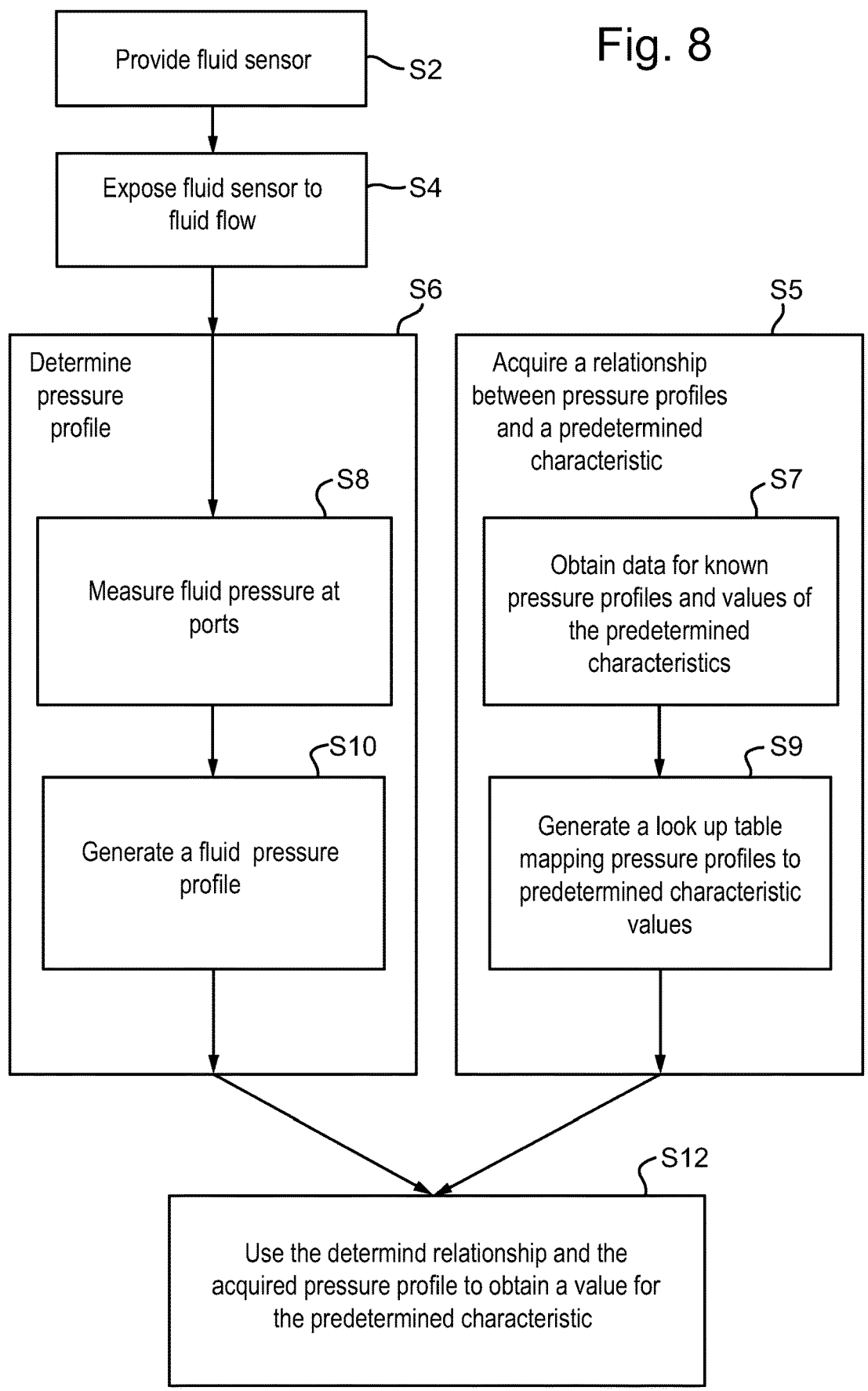
FIG. 8 shows a flow diagram setting out a method of sensing a fluid.

In operation, and referring to FIG. 8, a fluid sensor (for example 100, 200 or 300) is provided at step S2 and exposed to a fluid flow at step S4.

Then at generalised step S6, the fluid pressure profile can be determined. More particularly, the fluid pressure at the ports can at step S8 be measured (using for example the transducers 126 and the processor 128) and consolidated at step S10 to provide an overall fluid pressure profile for the fluid sensor. The fluid pressure profile is a time-variant signal.

Once obtained, the fluid pressure profile can be used at step S12 to infer certain characteristics of the fluid flow by reference to a previously-acquired relationship between the fluid pressure profile (for the particular fluid sensor) and a predetermined characteristic (generalised step S5).

More particularly, the relationship is acquired by at step S7 previously having obtained data for known pressure profile and known values of the certain fluid characteristics, and then at step S9 having used that data has to populate a look up table.

However, in alternative embodiments, instead of using a look up table to determine the relationship between pressure profiles and values of the fluid characteristics, a predictive algorithm may be used. Such a predictive algorithm can be a neural network which has been trained, using the known data, to map pressure profiles onto fluid characteristics.

It is contemplated that various predetermined characteristics of the fluid flow may be inferred using this approach. In particular, the fluid velocity and the fluid direction at the surface may be the predetermined characteristic determined in this way.

Figure 9:
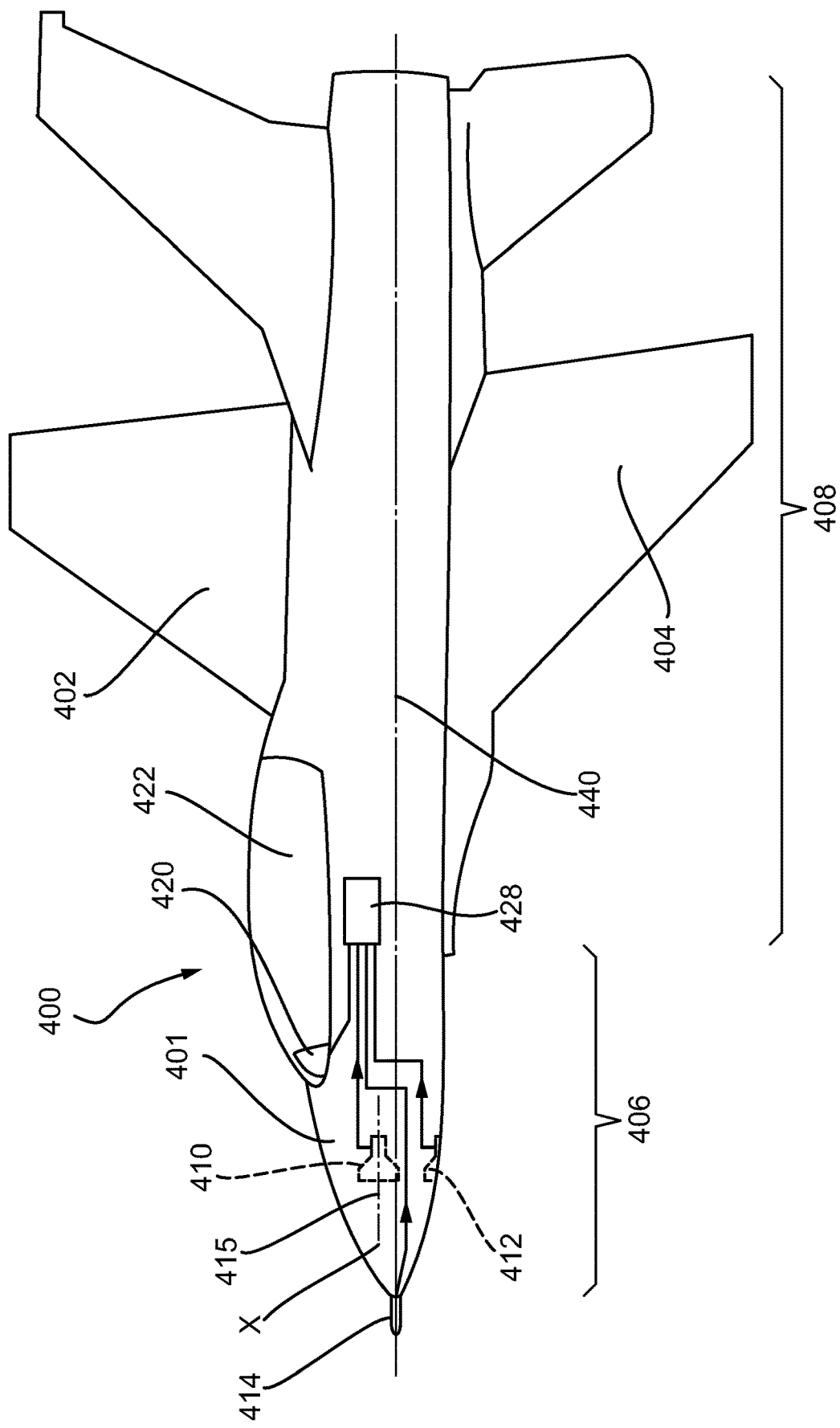
FIG. 9 shows diagrammatically an aircraft comprising air sensors.

Referring to FIG. 9 there is shown an aircraft 400.

The aircraft 400 is in the general form of a jet aircraft and defines an aircraft longitudinal axis 440.

The aircraft 400 comprises a wing structure made up of a starboard wing 402 and port wing 404. The portion of the aircraft 400 forwards of the wing structure is referred to as the forebody 406. The portion of the aircraft backwards of the forebody is referred to as the afterbody 408. The aircraft 400 is clad at its outer surfaces in a skin 401.

The aircraft 400 further comprises a first recessed fluid sensor 410 and a second recessed fluid sensor 412. Each of the sensors 410, 412 is formed by a recess in the skin 401 of the aircraft 400. Each recess is distinct from the overall topography of the skin, which may be planar in proximity to the recess or may be arcuate or otherwise contoured in proximity to the recess.

The fluid sensors 410, 412 are substantially similar to the fluid sensor 100, and are configured for sensing air (fluid sensors substantially similar to for example sensor 200 or 300 may be used in alternative embodiments). As such each of air sensors 410 and 412 comprise a port at the main skin topography (e.g. at the leading rim edge of the recess) and two ports within the respective recess. Associated with each of these ports is a respective transducer for generating an electrical signal representative of air pressure.

The first air sensor 410 is located on the port-side of the forebody 406, the second air sensor 412 is located on the underside of the forebody 406. A further air sensor (not shown) may be provided on the starboard-side of the forebody 406. The first air sensor 410 and second air sensor 412 comprise recesses having substantially the same form as fluid sensor 100.

The air sensors are located on the forebody such that the flow axis 415 they define (for example the flow axis 415 defined by the first air sensor 410, which is substantially equivalent to the longitudinal axis X of the fluid sensor 100) is generally aligned with the longitudinal axis 440 of the aircraft 400. This alignment may for example arise from the flow axis 415 being parallel with the longitudinal axis 440.

Still further, the aircraft 400 comprises a central processor 428 which receives as input from each of the air sensors 410 and 412 the electrical signals representative of pressure at their respective ports.

The processor 428 is configured to determine from these inputs certain characteristics of the air flow at the aircraft.

For example, the processor 428 is able to determine the local airspeed and the local direction of air flow for each sensor. This determination may be made by reference to an established data set (for example provided in the form of a look up table correlating pressure profiles with fluid characteristics).

With air pressure, airspeed and air direction determined for each sensor, the processor 428 may be further configured to determine aircraft characteristics such as pressure altitude, angle of attack and sideslip.

The aircraft 400 further comprises a pitot tube 414 at the foremost point which may also feed a signal representative of pressure into the central processor 428 for use in further corroborating results. The provision of a pitot tube enables further pressure data to be collected; however alternative embodiments do not comprise a pitot tube, and sufficient air pressure data can be collected from only the air sensors 410, 412.

The processor 428 is further connected to a display 420 in the cockpit 422 so that the determinations of the processor 428 can be displayed to a pilot in a human-readable format.

In operation, with the aircraft in flight (for example any of the phases of flight including take off, climb, cruise, descent and landing), air will flow over the forebody and through the channels defined by the recessed air sensors 410 and 412.

Whilst flowing through the air sensors 410, 412, the air will impinge on the pressure sensor ports and give rise to the generation of air pressure data at the respective transducers.

The air pressure data from each of the transducers is relayed to the central computer 428 where it can be processed to determine an air pressure profile for each of the air sensors 410, 412.

From the sensor-specific air pressure profile, values of certain flow characteristic can be determined. For example the air velocity at each air sensor 410, 412 may be determined.

Alternatively or additionally, if two or more recess ports are provided at each air sensor, then air flow direction for such an air sensor can be determined.

Moreover, with air pressure profiles provided for two or more separate air sensors 410, 412, information about flight characteristics (e.g. angle of attack, sideslip) can be determined at the central processor.

Further, with two or more pressure profiles obtained from separate sensors 410, 412, an average of the values could be taken. The average may be the mean, mode or median.

Still further, if three recessed air sensors or more are provided, then any outlying data can be identified and ignored, for example by majority voting. Thus an aircraft 400 provided with not only air sensor 410, 412 but also a further air sensor on the starboard-side (not shown), can compare air pressure profiles so that any outliers in the readings will become apparent.

Thus, where two or more air sensors are provided then not only does that lead to a higher resolution understanding of air flow at the forebody, but also steps can be taken to smooth out the results from any error-prone or malfunctioning air sensor.

In addition to the embodiments explicitly discussed above, the skilled person would be able to readily understand further inventions within the scope of the present disclosure. Such inventions could combine features from the above embodiments.

Other variants would also be within the scope of the invention such as: the provision of a surface which is not necessarily planar, but could be curved or faceted; the provision of a non-symmetrical recess; a greater number of ports could be provided as an array for more resolution in determining the pressure profile; and the topography of the recess need not be configured for fluid flow from a particular direction, and instead could be configured to determine fluid flow from any direction, in such variants, the recess may have a rotational symmetry and be absent a taper.

The surface and the recess may be fabricated from a smooth skin material that is substantially non-porous and suitable for forming into the relevant three dimensional shaped. For example the surface and the recess may be formed from a metal, optionally coated with a paint.

The invention claimed is:

1. An aircraft configured to collect air data, the aircraft comprising:
    a wing structure;
    a forebody, forward of the wing structure;
    an afterbody, backward of the forebody;
    a skin covering the wing, the forebody and the afterbody;
    at least one recess formed at the skin, the recess being configured to affect the pressure of air flowing at the recess;
    at least one ambient sensor port for measuring ambient air pressure at the skin; and
    at least one recess sensor port for measuring the air pressure at the recess.

2. The aircraft according to claim 1 wherein the at least one recess is formed at the forebody of the aircraft.

3. The aircraft according to claim 2 wherein at least one recess is formed on a lateral part of the forebody, or a lower part of the forebody.

4. The aircraft according to claim 1 comprising at least a first and a second recess.

5. The aircraft according to claim 4 further comprising:
    at each recess, a transducer at each of the respective sensor ports for converting the detected air pressure into an air pressure signal,
    a processor operably connected to each of the transducers at each of the recesses and configured to:
    receive the air pressure signal from each transducer;
    generate from the air pressure signals an air pressure profile; and
    determine, using the air pressure profile, at least one characteristic of the air.

6. The aircraft according to claim 4 wherein the first recess is provided at a port-side lateral part of the forebody.

7. The aircraft according to claim 4 wherein a second recess is provided at a starboard-side lateral part of the forebody.

8. The aircraft according to claim 4 comprising a third recess.

9. The aircraft according to claim 1 wherein each of the at least one recesses comprises a first recess sensor port and a second recess sensor port.

10. The aircraft according to claim 1 wherein each of the at least one recesses is configured for channeling air along a particular course axis, and that course axis is aligned with the aircraft longitudinal axis.

11. A method of determining air flow at an aircraft, the aircraft comprising:
    a wing structure;
    a forebody, forward of the wing structure;
    an afterbody, backward of the forebody;
    a skin covering the wing, the forebody and the afterbody;
    at least one recess formed at the skin, the recess being configured to affect the pressure of air flowing at the recess;
    at least one ambient sensor port for measuring ambient air pressure at the skin; and
    at least one recess sensor port for measuring the air pressure at the recess, the method comprising:
    exposing the aircraft to air flow;
    detecting the air pressure at each of the ambient sensor port and the recess sensor port, to determine an air pressure profile;
    acquiring a relationship between the air pressure profile and a predetermined air characteristic; and
    applying the relationship to the air pressure profile to determine a value for the predetermined air characteristic.

12. The method according to claim 11 wherein exposing the air sensor to air flow comprises flying the aircraft.

13. The method according to claim 11 wherein the aircraft further comprises at least one further recess formed at the skin, the method further comprising:
    detecting the air pressure at each of the ambient sensor and the recess sensor port of the further recess to determine an air pressure profile for the at least one further recess;
    acquiring a relationship between the air pressure profile for the at least one further recess and the predetermined air characteristic; and
    applying the relationship to the air pressure profile for the further recess to determine at least one further value for the predetermined air characteristic.

14. The method according to claim 13 further comprising comparing the value for the predetermined air characteristic to the at least one further value of the predetermined characteristic.

15. The method according to claim 14 wherein at least two further recesses are provided and comparing the value of the predetermined characteristic to the at least two further values of the predetermined characteristic comprises determining an average value.

* * * * *